United States Patent
Lin et al.

(10) Patent No.: US 9,578,356 B1
(45) Date of Patent: Feb. 21, 2017

(54) LIVE VIDEO MATCHING METHOD AND SYSTEM

(71) Applicants: NANNING FUGUI PRECISION INDUSTRIAL CO., LTD., Nanning (CN); HON HAI PRECISION INDUSTRY CO., LTD., New Taipei (TW)

(72) Inventors: Shih-Neng Lin, New Taipei (TW); Kuan-Hung Lin, New Taipei (TW); Chi-Feng Lee, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/940,432

(22) Filed: Nov. 13, 2015

(51) Int. Cl.
| H04N 21/2385 | (2011.01) |
| H04N 21/239 | (2011.01) |
| H04N 21/24 | (2011.01) |
| H04N 21/647 | (2011.01) |
| H04N 21/63 | (2011.01) |

(52) U.S. Cl.
CPC ...... *H04N 21/2385* (2013.01); *H04N 21/2393* (2013.01); *H04N 21/2402* (2013.01); *H04N 21/632* (2013.01); *H04N 21/64738* (2013.01)

(58) Field of Classification Search
CPC ............ H04N 21/4316; H04N 21/4788; H04N 21/6125; H04N 21/6175; H04N 7/15; H04L 45/00; H04L 45/02; H04L 45/121; H04L 45/22; H04L 45/12; H04L 45/125; H04L 45/126; H04L 45/302; H04L 45/34
See application file for complete search history.

(56) References Cited

U.S. PATENT DOCUMENTS

| 6,275,470 | B1 * | 8/2001 | Ricciulli | ............... F25B 41/003 370/238 |
| 2002/0028656 | A1* | 3/2002 | Yemini | ............. H04L 29/12009 455/41.2 |
| 2006/0184624 | A1* | 8/2006 | Thukral | ................... H04N 7/15 709/204 |
| 2008/0080473 | A1* | 4/2008 | Thubert | .............. G06F 13/4045 370/348 |
| 2013/0010797 | A1* | 1/2013 | Brandwine | ......... H04L 12/4641 370/392 |

* cited by examiner

*Primary Examiner* — Benjamin R Bruckart
*Assistant Examiner* — Jen-Shi Huang
(74) *Attorney, Agent, or Firm* — Zhigang Ma

(57) ABSTRACT

A live video matching system provides a matching service between a video demander and a video provider. An orchestration module of the system dynamically adjusts live services provided by SDN edge devices according to network available resources. An SDN edge device of the system dynamically converts and integrates multiple video streams to generate a virtual channel based on results of matching within multiple requests for videos and provides live video channels for interested users.

20 Claims, 6 Drawing Sheets

LIVE VIDEO MATCHING METHOD AND SYSTEM

FIELD

The subject matter herein generally relates to video broadcasting technologies.

BACKGROUND

As mobile networks are developed and smart phones are popular, network application services are important. Live video matching services, for example, have been provided by many mobile applications and web sites, which are implemented via the Peer-to-Peer (P2P) communication or the client-server architecture.

However, the Peer-to-Peer (P2P) communication may have heavy loading when numerous clients request live video services at the same time. In regard to the client-server architecture, video data streams are transmitted to the clients via a content delivery network server, which results in high latency and bandwidth bottlenecks.

BRIEF DESCRIPTION OF THE DRAWINGS

Implementations of the present technology will now be described, by way of example only, with reference to the attached figures.

DETAILED DESCRIPTION

Figure 1:
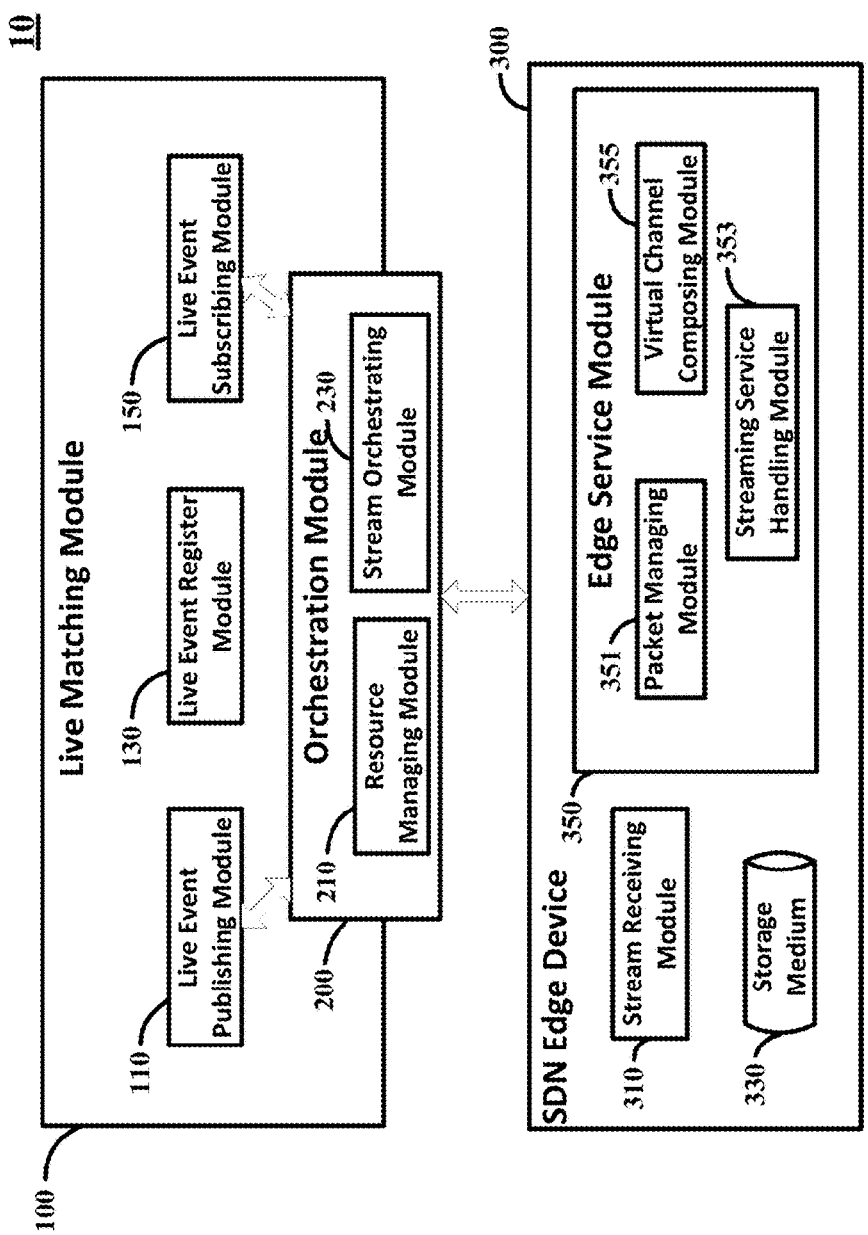
FIG. 1 is a diagrammatic view of an embodiment of a live video matching system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

An embodiment of a live video matching method and system provides a video demander in a live video matching service. In other words, the video demander sends a channel request to a video provider and the video provider, when receiving the channel request, broadcasts video streams in a software defined networking (SDN) network for video stream selection by the video demander. Further, an edge SDN device converts and integrates video streams retrieved from the SDN network to create a virtual channel for providing a live video service. An improved optimized forwarding path (OFP+) method is used to generate optimized transmission paths, according to available network resources and loading capabilities of nodes in the network, for video transmissions between the video provider and the video demander.

FIG. 1 is an embodiment of a live video matching system 10. The one or more function modules can include computerized code in the form of one or more programs that are stored in a storage unit (not shown), and executed by a processor (not shown) to provide functions of the live video matching 10. The storage unit can be a dedicated memory, such as an EPROM or a flash memory.

In an embodiment, the live video matching system 10 comprises a live matching module 100, an orchestration module 200, and multiple SDN edge devices 300.

In an embodiment, the live matching module 100 further comprises a live event publishing module 110, a live event register module 130, and a live event subscribing module 150. The orchestration module 200 further comprises a resource managing module 210 and a stream orchestrating module 230. Each of the SDN edge devices 300 further comprises a stream receiving module 310, a storage medium 330, and an edge service module 350. The edge service module 350 further comprises a packet managing module 351, a virtual channel composing module 353, and a streaming service handling module 355.

In an embodiment, the live matching module 100 provides a live video matching service between a video demander and a video provider. The orchestration module 200 dynamically adjusts available live video services provided by the SDN edge devices 300, based on available network resources. The edge service module 350 dynamically converts and integrates video streams into a virtual channel according to results of matching, providing selectable live channel services. Detailed descriptions of the functions of the described modules are given with reference to FIGS. 2, 3, and 5.

Figure 2:
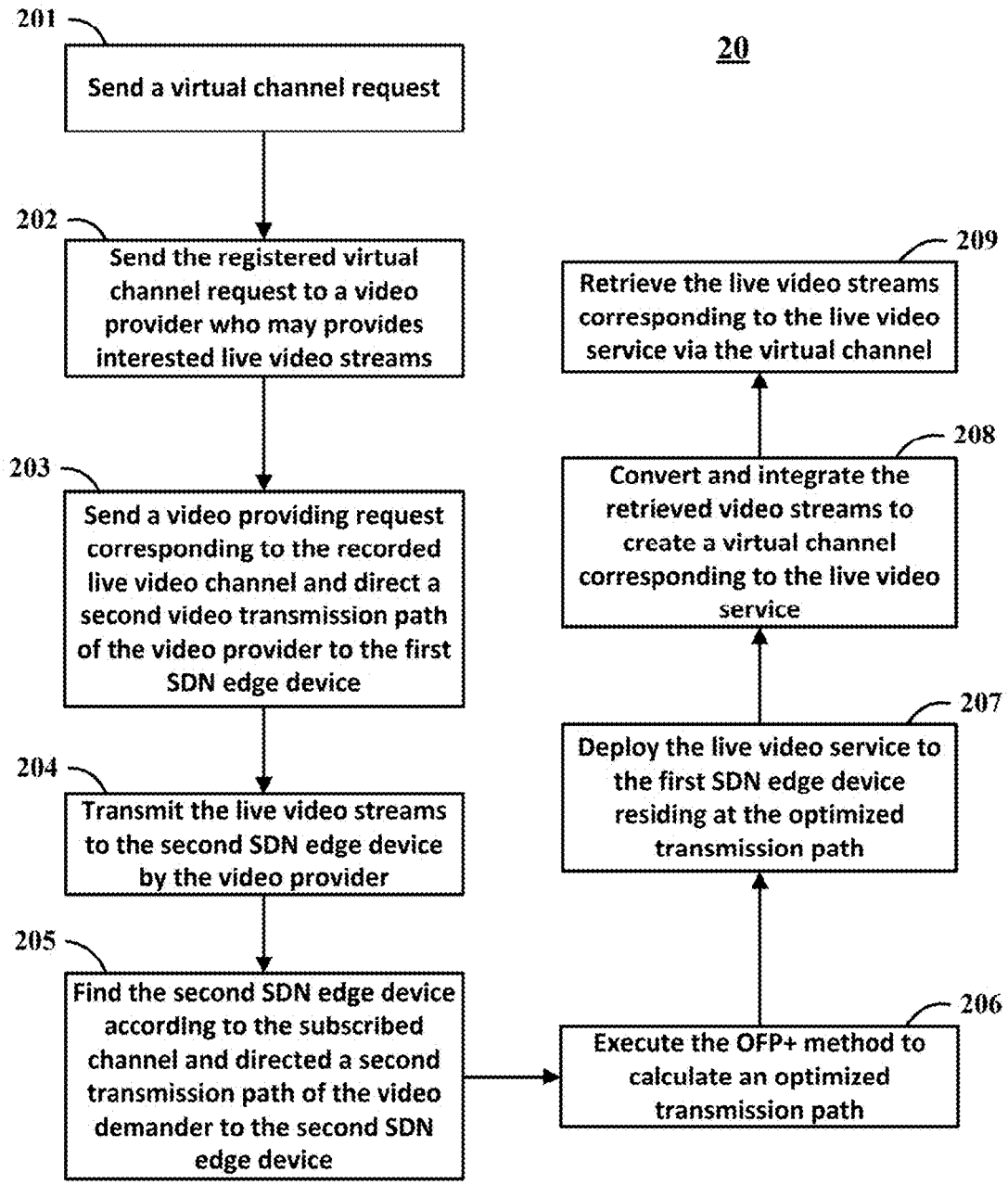
FIG. 2 is a flowchart of an embodiment of a live video matching method in the live video matching system of FIG. 1.

Referring to FIG. 2, a flowchart is presented in accordance with an example embodiment of an SDN data delivery method 20. The method 20 is provided by way of example, as there are a variety of ways to carry out the method. The method 20 described below can be carried out using the configurations illustrated in FIG. 1, for example, and various elements of these figures are referenced in explaining the processing method 20. Each block shown in FIG. 2 represents one or more processes, methods, or subroutines, carried out in the exemplary method 20. Additionally, the illustrated order of blocks is by example only and the order of the blocks can change. The method 20 can begin at block 201.

At block 201, a client A, which is a video demander, sends a virtual channel request for a live video service. In an embodiment, the virtual channel request requires at least one live video channel, for example, a concert channel, in which the video demander is interested. The virtual channel request is registered to the live matching module 100 via the live event register module 130.

At block 202, the live matching module 100 sends the registered virtual channel request to at least one video provider, for example, a client B, who may provide live video streams of possible interest to viewers.

At block 203, when receiving the virtual channel request, the video provider client B sends a video providing request corresponding to the required live video channel via the live event publishing module 110. The live event publishing module 110 finds a first SDN edge device 300 adaptable to receive the live video streams through the orchestration module 200 and directs a second video transmission path of the video provider client B to the first SDN edge device 300 for transmitting the live video streams of the concert channel.

At block 204, the client B, starts to transmit the live video streams to a second stream receiving module 310 of the second SDN edge device 300 using the live event publishing module 110.

At block 205, the video demander client A, is a video demander requiring the at least one channel, for example, the concert channel, via the live event subscribing module 150. The live event subscribing module 150 finds the second SDN edge device 300 which is able to provide the live video streams corresponding to the concert channel via the orchestration module 200. A second transmission path of the client A is directed to the second SDN edge device 300 to be ready to receive the live video streams corresponding to the concert channel.

At block 206, the orchestration module 200 enables the stream orchestrating module 230 to execute the OFP+ method according to service configurations and network statuses retrieved by the resource managing module 210, to calculate an optimized transmission path.

At block 207, the stream orchestrating module 230 deploys the live video service requested by the client A to the first SDN edge device 300 residing on the optimized transmission path.

At block 208, retrieved video streams are converted and integrated to create a virtual channel corresponding to the live video service, using the virtual channel composing module 353 of the first SDN edge device 300.

At block 209, the client A retrieves the live video streams corresponding to the live video service via the virtual channel through a first streaming service handling module 355 of the first SDN edge device 300.

Figure 3:
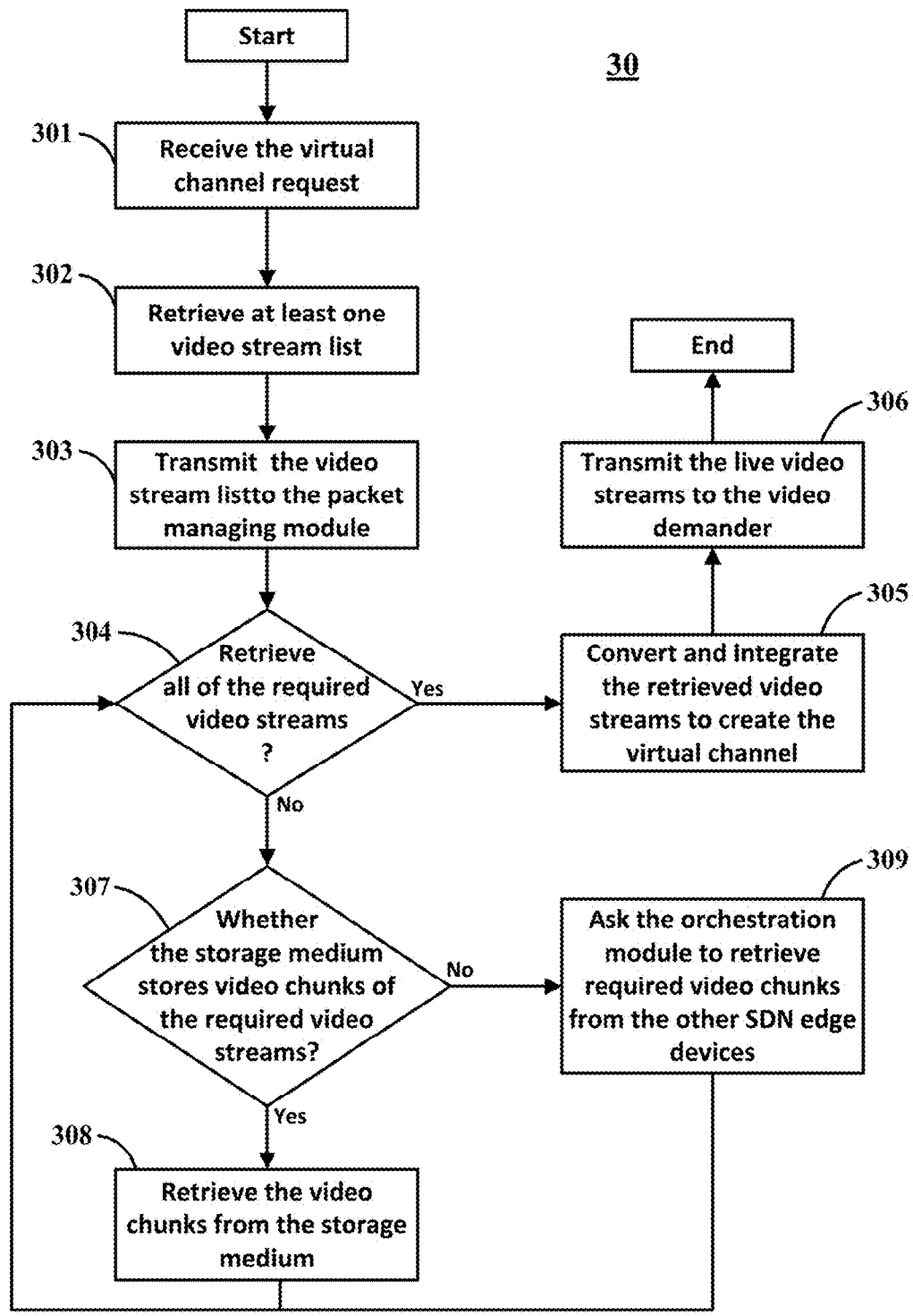
FIG. 3 is a flowchart of an embodiment of a virtual channel creation method in the live video matching system of FIG. 1.

Referring to FIG. 3, a flowchart is presented in accordance with an example embodiment of a virtual channel creation method 30. The method 30 is provided by way of example, as there are a variety of ways to carry out the method. The method 30 described below can be carried out using the configurations illustrated in FIG. 1, for example, and various elements of these figures are referenced in explaining the processing method 30. Each block shown in FIG. 3 represents one or more processes, methods, or subroutines, carried out in the exemplary method 30. Additionally, the illustrated order of blocks is by example only and the order of the blocks can change. The method 30 can begin at block 301.

At block 301, the first SDN edge device 300 receives the virtual channel request from the client A.

At block 302, the first SDN edge device 300 retrieves at least one list of video streams from the virtual channel request. The video stream list records video channels, for example, a first video channel and a second video channel, in which the video demander is interested.

At block 303, the video stream list is transmitted to the packet managing module 351.

At block 304, the packet managing module 351 determines whether a first live video stream of the first video channel and a second live video stream of the second video channel are obtained.

At block 305, when the first live video stream and the second live video stream are obtained, the virtual channel composing module 353 of the first SDN edge device 300 converts and integrates the first live video stream and the second live video stream to create the virtual channel.

At block 306, the virtual channel composing module 353 of the first SDN edge device 300 transmits the first live video stream and the second live video stream to the client A via the virtual channel.

At block 307, if any required video stream is not obtained, the packet managing module 351 of the first SDN edge device 300 determines whether the storage medium 330 stores chunks of video of the required video streams.

At block 308, if the storage medium 330 stores the chunks of video of the required video stream, the video chunks are retrieved from the storage medium 330.

At block 309, if no video chunk of the required video stream is stored in the storage medium 330, the first SDN edge devices 300 requests the orchestration module 200 to obtain such video chunks from the second SDN edge device 300. The process then proceeds to block 304 for determining whether all video streams recorded in the video stream list are obtained.

Figure 4:
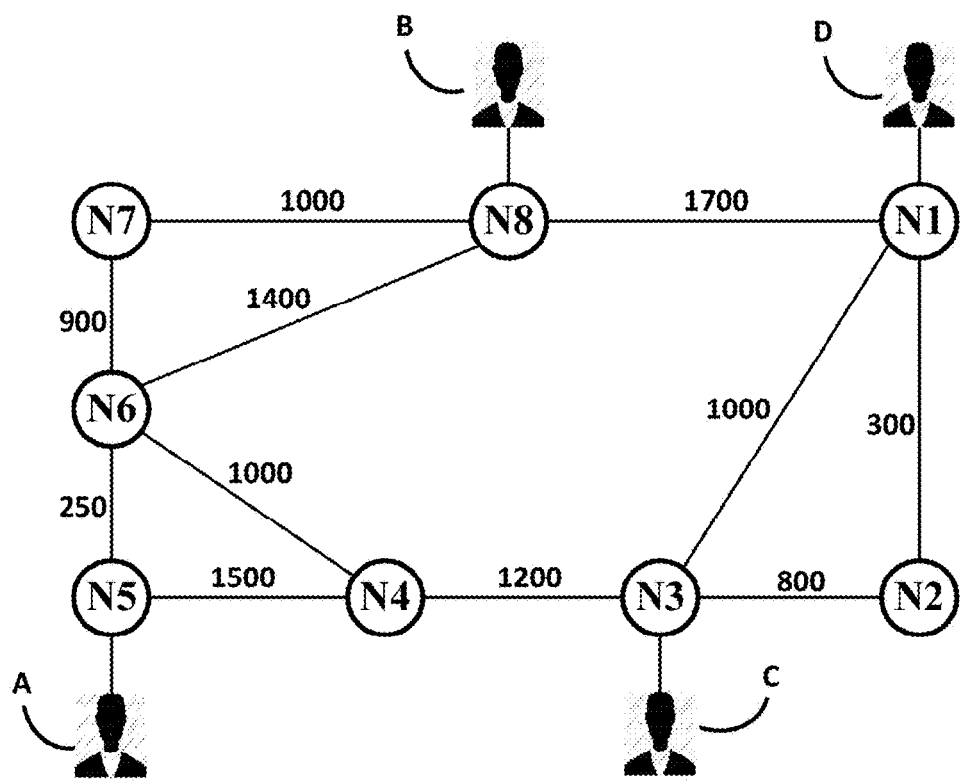
FIG. 4 shows a diagrammatic view of an embodiment of an optimized forwarding path (OFP) method in the live video matching system of FIG. 1.
Figure 5:
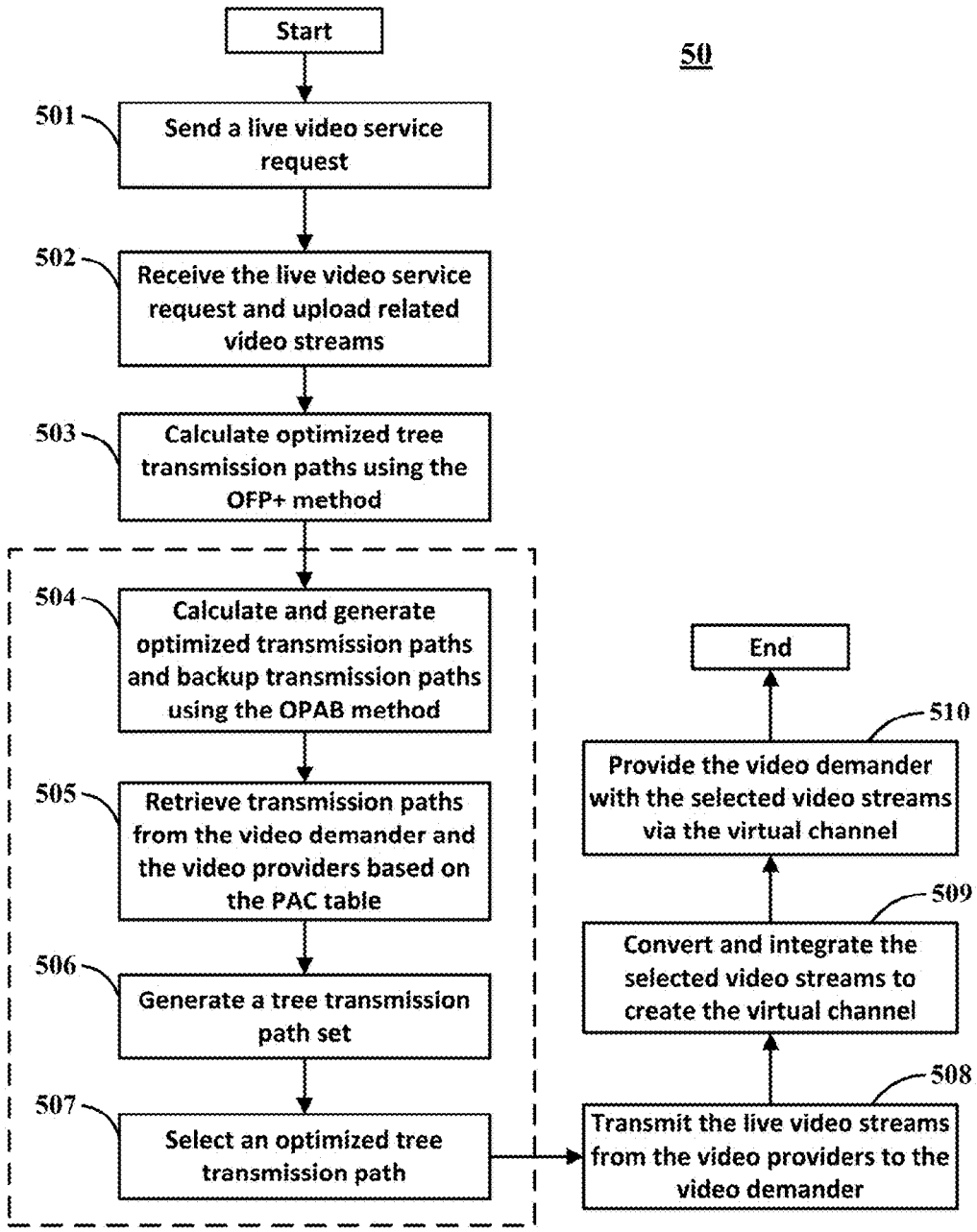
FIG. 5 shows a flowchart of an embodiment of the OFP method of FIG. 4.

FIG. 4 shows an embodiment of the OFP+ method. FIG. 5 shows a flowchart of an embodiment of the OFP+ method.

Referring to FIG. 5, a flowchart is presented in accordance with an example embodiment of an OFP+ method 50. The method 50 is provided by way of example, as there are a variety of ways to carry out the method. The method 50 described below can be carried out using the configurations illustrated in FIGS. 1 and 4, for example, and various elements of these figures are referenced in explaining the processing method 50. Each block shown in FIG. 5 represents one or more processes, methods, or subroutines, carried out in the exemplary method 50. Additionally, the illustrated order of blocks is by example only and the order of the blocks can change. The method 50 can begin at block 501.

In an embodiment, a network topology shown in FIG. 4 comprises clients A, B, C, and D, and SDN forwarding devices N1-N8. Distances between each of the SDN forwarding devices are shown by numbers beside the transmission paths shown in FIG. 4.

At block 501, client A as a video demander sends a live video service request.

At block 502, the clients B, C and D, as video providers receive the live video service request and upload video streams related to the live video service request.

At block 503, the orchestration module 200 calculates optimized tree transmission paths according to available network resources and loading capabilities of the SDN forwarding devices, using the OFP+ method. Implementation of the OFP+ method is described at blocks 504-507.

At block 504, optimized transmission paths and backup transmission paths from an initial node, from the SDN forwarding device N5 for the video demander, and from the client A, to the other nodes, the other SDN forwarding devices, are calculated and generated using an optimized path available bandwidth (OPAB) method.

In an embodiment, the SDN forwarding device N5 connecting to the client A is set as an initial node, and a path available cost (PAC) table, shown below as Table 1, is generated using the OFP+ method. The PAC table records at least one optimized transmission path with the minimum cost value and at least one backup transmission path between SDN forwarding device N5 and SDN forwarding devices N1, N2, and N8.

TABLE 1

| | Path | Vertex | PAC 1 | PAC 2 | PAC 3 | PAC 4 | PAC 5 | PAC 6 | PAC 7 | PAC 8 |
|---|---|---|---|---|---|---|---|---|---|---|
| Start | — | 5 | — | — | — | 1500 | 0 | 250 | — | — |
| 1 | 5 | 6 | — | — | — | 1000 | — | 250 | 900 | 1400 |
| 2 | 5, 6 | 7 | — | — | — | — | — | — | 900 | 1000 |
| 3 | 5, 6, 7 | 4 | — | — | 1200 | 1000 | — | — | — | — |
| 4 | 5, 6, 7, 4 | 8 | 1700 | — | — | — | — | — | — | 1000 |
| 5 | 5, 6, 7, 4, 8 | 3 | 1200 | 1200 | 1200 | — | — | — | — | — |
| 6 | 5, 6, 7, 4, 8, 3 | 2 | 1200 (1200) | 1200 | — | — | — | — | — | — |
| 7 | 5, 6, 7, 4, 8, 3, 2 | 1 | 1200 | | | | | | | |

At block 505, at least one optimized transmission path and multiple backup transmission paths, from the SDN forwarding device N5 to the SDN forwarding devices N1, N3, and N8, are retrieved based on the PAC table shown in Table 1.

The transmission paths obtained according to the PAC table shown in Table 1 are as follows.

Transmission paths from the SDN forwarding device N5 to the SDN forwarding device N1 ($Path_1$) comprise:

$Path_{11}$: 1→3→4→6→5 (Cost: 1200);
$Path_{12}$: 1→2→3→4→6→5 (Cost: 1200);
$Path_{13}$: 1→8→7→6→5 (Cost: 1700);
$Path_{14}$: 1→3→4→5 (Cost: 1500);
$Path_{15}$: 1→2→3→4→5 (Cost: 1200); and
$Path_{16}$: 1→2→3→4→6→5 (Cost: 1200).

Transmission paths from the SDN forwarding device N5 to the SDN forwarding device N1 ($Path_3$) comprise:

$Path_{31}$: 3→4→6→5 (Cost: 1200); and
$Path_{32}$: 3→4→5 (Cost: 1500).

Transmission paths from the SDN forwarding device N5 to the SDN forwarding device N8 ($Path_8$) comprise:

$Path_{81}$: 8→7→6→5 (Cost: 1000); and
$Path_{82}$ 8→6→5 (Cost: 1400).

At block 506, multiple tree transmission paths between the SDN forwarding device N5 of the client A and the SDN forwarding device N1 of the client D are retrieved from the transmission paths, as are multiple tree transmission paths between the SDN forwarding device N3 of the client C and the SDN forwarding device N8 of the client B, thus generating a tree transmission path set.

Figure 6:
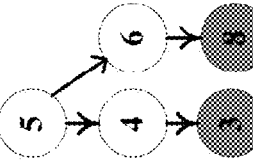
FIG. 6 is a diagrammatic view of an embodiment of a tree transmission path set generated using the OFP method of FIG. 4.

The transmission paths from $Path_1$, $Path_3$, and $Path_8$ are rearranged to obtain the tree transmission paths, $TPath_{ijk}$, as shown in FIG. 6, in which i indicates the i-th transmission path from $Path_1$, j indicates the j-th transmission path from $Path_3$, and k indicates the k-th transmission path from $Path_8$.

At block 507, an optimized tree transmission path is selected from the tree transmission path set according to the cost values of the tree transmission paths, and the loading capabilities of each of the nodes.

At block 508, the nodes of the optimized tree transmission path are configured as forwarding nodes so that the clients B, C and D can transmit live video streams to the client A.

At block 509, the SDN edge forwarding device N5 receives video streams selected by the client A and converts and integrates the selected video streams to create the virtual channel.

At block 510, the SDN edge forwarding device N5 provides the client A with the selected video streams via the virtual channel.

The embodiments shown and described above are only examples. Many details are often found in the art such as the other features of an SDN controller. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, executable by a processor of a live video mate system, the method comprising:
    sending a virtual channel request for a live video service via a first client, where 5 virtual channel request records at least one live video channel in which the first client is interested;
    registering the virtual channel request to a live matching module via a live register module of the live matching module;
    sending the registered virtual channel request to at least a second client via the live matching module;
    when receiving the virtual channel request, sending a video providing request, by second client, via a live event publishing module;
    finding a second Software Defined Networking (SDN) edge device through an orchestration module and directing a video transmission path of the second client to the second SDN edge device using live event publishing module;

transmitting live video streams corresponding to the virtual channel request to a second stream receiving module of the second SDN edge device via the live event publishing module;
subscribing at least a first channel via the live event subscribing module;
finding a first SDN edge device providing the live video streams corresponding to a concert channel via the orchestration module;
directing a first transmission path of the first client to the first SDN edge device;
calculating an optimized transmission path according to service configurations and network statuses retrieved by a resource managing module;
deploying the live video service requested by the first client to the first SDN device residing at the optimized transmission path;
converting and integrating the live video streams to create a virtual channel corresponding to the live video service using a virtual channel composing module of the first SDN edge device; and
retrieving the live video streams corresponding to the live video service via the virtual channel through a first streaming service handling module of the first SDN edge device.

2. The method as claimed in claim 1, wherein the step of creating the virtual channel further comprises:
receiving the virtual channel request from the first client via the first SDN edge device;
retrieving at least one video stream list from the virtual channel request via the first SDN edge device, wherein the video stream list records at least a first video channel and a second video channel in which the first client is interested;
transmitting the video stream list to a packet managing module of the first SDN edge device;
determining whether a first live video stream of the first video channel and a live video stream of the second video channel are retrieved via the packet managing module;
converting and integrating the first live video stream and the second live video stream to create the virtual channel using the virtual channel composing module when the first video stream and the second live video stream are retrieved; and
transmitting the first live video stream and the second live video stream to the first client via the virtual channel through the virtual channel composing module.

3. The method as claimed in claim 2, further comprising:
determining whether a first storage medium of the first SDN edge device store video chunks of the first and second live video streams using the packet managing module if any one of the first and second live video streams is not retrieved;
retrieving the video chunks from the first storage medium if the first storage medium stores the video chunks of the first and second live video streams; and
asking the orchestration module to retrieve required video chunks from the second SDN edge device if no video chunk of the first and second live video streams is store the first storage medium.

4. The method as claimed in claim 1, further comprising calculating the optimized transmission path using an Improved Optimized Forwarding Path (OFP+) method.

5. The method as claimed in claim 4, the process of calculating the optimized transmission path using the OFP+ method further comprises:

sending a live video service request to a plurality of remote clients via the first client;
when receiving the live video service request, uploading a plurality of video streams related to the live video service request via the remote clients; and
calculating an optimized tree transmission path according to available network resources and loading capabilities of SDN forwarding devices between the remote clients using the OFP+ method through the orchestration module.

6. The method as claimed in claim 5, the process of calculating the optimized tree transmission path further comprises:
calculating optimized transmission paths and backup transmission paths from the first client to each of the SDN forwarding devices using an Optimized Path Available Bandwidth (OPAB) method to generate a path available cost table;
obtaining transmission paths from the first client to each of the remote clients according to the path available cost table;
analyzing the transmission paths to obtain specific transmission paths from the client to each of the remote clients for generating a tree transmission path set comprising multiple tree transmission paths; and
selecting an optimized tree transmission path from the tree transmission path set according to cost values of the tree transmission paths and loading capabilities of SDN forwarding devices.

7. The method as claimed in claim 6, wherein the path available cost table records at least one optimized transmission path with the minimum cost value and at least one backup transmission path between the SDN forwarding devices.

8. A non-transitory storage medium, storing a set of instructions, the set of instructions being executed by a processor of a creating device, to perform a method comprising:
sending a virtual channel request for a live video service via a first client, where the virtual channel request records at least one live video channel in which the first client is interested;
registering the virtual channel request to a live matching module via a live event register module of the live matching module;
sending the registered virtual channel request to at least a second client via the live matching module;
when receiving the virtual channel request, sending a video providing request, by the second client, via a live event publishing module;
finding a second Software Defined Networking (SDN) edge device through an orchestration module and directing a video transmission path of the second client to the second SDN edge device using live event publishing module;
transmitting live video streams corresponding to the virtual channel request to a second stream receiving module of the second SDN edge device via the live event publishing module;
subscribing at least a first channel via the live event subscribing module;
finding a first SDN edge device providing the live video streams corresponding to a concert channel via the orchestration module;
directing a first transmission path of the first client to the first SDN edge device;

calculating an optimized transmission path according to service configurations and network statuses retrieved by the resource managing module;

deploying the live video service requested by the first client to the first SDN edge device residing at the optimized transmission path;

converting and integrating the live video streams to create a virtual channel corresponding to the live video service using a virtual channel composing module of the first SDN edge device; and retrieving the live video streams corresponding to the live video service via the virtual channel through a first streaming service handling module of the first SDN edge device.

9. The non-transitory storage medium as claimed in claim 8, wherein the step of creating the virtual channel further comprises:

receiving the virtual channel request from the first client via the first SDN edge device;

retrieving at least one video stream list from the virtual channel request via the first SDN edge device, wherein the video stream list records at least a first video channel and a second video channel in which the first client is interested;

transmitting the video stream list to a packet managing module of the first SDN device;

determining whether a first live video stream of the first video channel and a second live video stream of the second video channel are retrieved via the packet managing module;

converting and integrating the first live video stream and the second live video stream to create the virtual channel using the virtual channel composing module when the first video stream and the second live video stream are retrieved; and transmitting the first live video stream and the second live video stream to the client via the virtual channel through the virtual channel composing module.

10. The non-transitory storage medium as claimed in claim 9, further comprising:

determining whether a first storage medium of the first SDN edge device stores video chunks of the first and second live video streams using the packet managing module if any one of the first and second live video streams is not retrieved;

retrieving the video chunks from the first storage medium if the first storage medium stores the video chunks of the first and second live video streams; and asking the orchestration module to retrieve required video chunks from the second SDN edge device if no video chunk of the first and second live video streams is stored the first storage medium.

11. The non-transitory storage medium as claimed in claim 8, further com calculating the optimized transmission path using an Improved Optimized Forwarding Path (OFP+) method.

12. The non-transitory storage medium as claimed in claim 11, the process of calculating the optimized transmission path using the OFP+ method further comprises:

sending a live video service request to a plurality of remote clients via the first client;

when receiving the live video service request, uploading a plurality of video streams related to the live video service request via the remote clients; and calculating an optimized tree transmission path according to available network resources and loading capabilities of SDN forwarding devices between the remote clients using the OFP+ method through the orchestration module.

13. The non-transitory storage medium as claimed in claim 12, the process of calculating the optimized tree transmission path further comprises:

calculating optimized transmission paths and backup transmission paths from the first client to each of the SDN forwarding devices using an Improved Optimized Forwarding Path (OFP+) method to generate a path available cost table;

obtaining transmission paths from the first client to each of the remote according to the path available cost table;

analyzing the transmission paths to obtain specific transmission paths from the first client to each of the remote clients for generating a tree transmission path set comprising multiple tree transmission paths; and selecting an optimized tree transmission path from the tree transmission path set according to cost values of the tree transmission paths and loading capabilities of each of SDN forwarding devices.

14. The non-transitory storage medium as claimed in claim 13, wherein the path available cost table records at least one optimized transmission path with the minimum cost value and at least one backup transmission path between the SDN forwarding devices.

15. A live video matching system, comprising:

at least one processor;

a storage system; and one or more programs that are stored in the storage system and executed by the at least one processor, the one or more programs comprising instructions for:

sending a virtual channel request for a live video service via a first client, wherein the virtual channel request records at least one live video channel in which the first client is interested;

registering the virtual channel request to a live matching module via a live event register module of the live matching module;

sending the registered virtual channel request to at least a second client via the live matching module;

when receiving the virtual channel request, sending a video providing request, by the second client, via a live event publishing module;

finding a second Software Defined Networking (SDN) edge device through an orchestration module and directing a video transmission path of the second client to the second SDN edge device using live event publishing module;

transmitting live video streams corresponding to the virtual channel request to a second stream receiving module of the second SDN edge device via the live event publishing: module;

subscribing at least a first channel via the live event subscribing module;

finding a first SDN edge device providing the live video streams corresponding to a concert channel via the orchestration module;

directing a first transmission path of the first client to the first SDN edge device;

calculating an optimized transmission path according to service configurations network statuses retrieved by the resource managing module;

deploying the live video service requested by the first client to the first SDN edge device residing at the optimized transmission path;

converting and integrating the live video streams to create a virtual channel corresponding to the live video service using a virtual channel composing module the first SDN edge device; and retrieving the live video streams corresponding to the live video service via the virtual channel through a first streaming service handling module of the first SDN edge device.

16. The system as claimed in claim 15, wherein the step of creating the virtual channel further comprises:

receiving the virtual channel request from the first client via the first SDN edge device;

retrieving at least one video stream list from the virtual channel request via the first SDN edge device, wherein the video stream list records at least a first video channel and a second video channel in which the first client is interested;

transmitting the video stream list to a packet managing module of the first SDN edge device;

determining whether a first live video stream of the first video channel and a live video stream of the second video channel are retrieved via the packet managing module;

converting and integrating the first live video stream and the second live video stream to create the virtual channel using the virtual channel composing module when the first video stream and the second live video stream are retrieved; and transmitting the first live video stream and the second live video stream to the first client via the virtual channel through the virtual channel composing module.

17. The system as claimed in claim 16, further comprising:

determining whether a first storage medium of the first SDN edge device store video chunks of the first and second live video streams using the packet managing module if any one of the first and second live video streams is not retrieved;

retrieving the video chunks from the first storage medium if the first storage medium stores the video chunks of the first and second live video streams; and asking the orchestration module to retrieve required video chunks from the second SDN edge device if no video chunk of the first and second live video streams is store the first storage medium.

18. The system as claimed in claim 15, further comprising calculating the optimized transmission path using an Improved Optimized Forwarding Path (OFP+) method.

19. The system as claimed in claim 18, the process of calculating the optimized transmission path using the OFP+ method further comprises:

sending a live video service request to a plurality of remote clients via the first client;

when receiving the live video service request, uploading a plurality of video streams related to the live video service request via the remote clients; and calculating an optimized tree transmission path according to available network resources and loading capabilities of SDN forwarding devices between the remote clients using the OFP+ method through the orchestration module.

20. The system as claimed in claim 19, the process of calculating the optimized tree transmission path further comprises:

calculating optimized transmission paths and backup transmission paths from the first client to each of the SDN forwarding devices using an Improved Optimized Forwarding Path (OFP+) method to generate a path available cost table;

obtaining transmission paths from the first client to each of the remote according to the path available cost table;

analyzing the transmission paths to obtain specific transmission paths from the first client to each of the remote clients for generating a tree transmission path set comprising multiple tree transmission paths; and selecting an optimized tree transmission path from the tree transmission path set according to cost values of the tree transmission paths and loading capabilities of each of SDN forwarding devices.

* * * * *